United States Patent [19]

Burleigh et al.

[11] Patent Number: 5,326,847
[45] Date of Patent: Jul. 5, 1994

[54] HINDERED PHENOLIC ANTIOXIDANT; ANTIOXIDANT CONTAINING HYDROPHILIC URETHANE POLYMER; DRY CLEANING SOLVENT RESISTANT, WATERPROOF, MOISTURE-VAPOR PERMEABLE MATERIAL CONTAINING THE POLYMER; AND METHOD OF MAKING THE SAME

[75] Inventors: Malcolm B. Burleigh; Roger A. Mader, both of St. Paul, Minn.

[73] Assignee: Minnesota Mining and Manufacturing Company, St. Paul, Minn.

[21] Appl. No.: 993,293

[22] Filed: Dec. 18, 1992

Related U.S. Application Data

[62] Division of Ser. No. 546,260, Jun. 28, 1990, Pat. No. 5,173,300.

[51] Int. Cl.$^5$ ............................................. C08G 18/12
[52] U.S. Cl. ........................................ 528/60; 528/76; 528/77; 528/904; 514/772.3; 424/445; 424/78.37
[58] Field of Search ................. 424/445, 78.02, 48.06, 424/78.37; 523/111, 112; 514/785, 772.3; 528/60, 76, 77, 904

[56] References Cited

U.S. PATENT DOCUMENTS

| | | | |
|---|---|---|---|
| 3,953,566 | 4/1976 | Gore | 264/288 |
| 4,194,041 | 3/1980 | Gore et al. | 428/315 |
| 4,443,511 | 4/1984 | Worden et al. | 428/198 |
| 4,539,256 | 9/1985 | Shipman | 428/315.5 |
| 4,613,544 | 9/1986 | Burleigh | 428/315.5 |
| 4,661,099 | 4/1987 | von Bittera et al. | 604/290 |
| 4,704,470 | 11/1987 | Johnson | 560/137 |
| 4,707,400 | 11/1987 | Towery | 428/260 |
| 4,808,675 | 2/1989 | Twilley et al. | 525/408 |
| 4,833,026 | 5/1989 | Kausch | 428/315.5 |
| 4,910,078 | 3/1990 | Hill et al. | 428/290 |

FOREIGN PATENT DOCUMENTS

| | | | |
|---|---|---|---|
| 0213925 | 11/1987 | European Pat. Off. | C07C 49/84 |
| 1912179 | 2/1969 | Fed. Rep. of Germany | C08G 41/00 |

OTHER PUBLICATIONS

"The Hindered Phenols", Stillson, Sawyer, and Hunt, *J. Am. Chem. Soc.*, 1945, pp. 303–307.
CA File Search Results—P229503S, Aug. 17, 1989, 23:14:27, p. 22.
CA File Search Results—P229503S, Aug. 17, 1989, 23:14:27, p. 20.
Pegistry File Search Results—229506N, Aug. 17, 1989, 23:15:09, p. 70.
Registry File Search Results—P229506N, Aug. 17, 1989, 23:15:09, p. 33 Annex to the European Search Report.

*Primary Examiner*—Thurman K. Page
*Assistant Examiner*—Neil Levy
*Attorney, Agent, or Firm*—Gary L. Griswold; Walter N. Kirn; Janice L. Dowdall

[57] ABSTRACT

The invention relates to a dry cleaning solvent resistant hydrophilic urethane polymer having about 0.5 to 10 weight percent of a hindered phenolic antioxidant reacted into its structure. The invention also relates to a hindered phenolic antioxidant capable of being reacted into the polymer. The invention also relates to a dry cleaning solvent resistant waterproof, moisture-vapor permeable material such as a laminate or a unitary sheet material. The unitary sheet material comprises a microporous polymeric matrix having pores comprising continuous passages extending through its thickness and opening into the opposite surfaces thereof, the passages being sufficiently filled with a moisture-vapor permeable, water-impermeable, hydrophilic material which comprises the polymer having the antioxidant reacted into its structure which prevents the passage of water and other liquids through the unitary sheet material while readily permitting moisture vapor transmission therethrough rendering the sheet material breathable. The unitary sheet material is made by causing a liquid composition comprising a hydrophilic material precursor to flow into the pores of the matrix, then causing the conversion thereof to solid hydrophilic material.

6 Claims, No Drawings

HINDERED PHENOLIC ANTIOXIDANT; ANTIOXIDANT CONTAINING HYDROPHILIC URETHANE POLYMER; DRY CLEANING SOLVENT RESISTANT, WATERPROOF, MOISTURE-VAPOR PERMEABLE MATERIAL CONTAINING THE POLYMER; AND METHOD OF MAKING THE SAME

This is a division of application No. 07/546,260 filed un. 28, 1990 U.S. Pat. No. 5,173,300.

TECHNICAL FIELD

This invention relates to a dry cleaning solvent resistant hydrophilic urethane polymer having a hindered phenolic antioxidant reacted into its structure; to a hindered phenolic antioxidant capable of being reacted into such a polymer; to a waterproof, moisture-vapor permeable material containing the polymer for use in clothing and other coverings for protecting against water and other liquids which is resistant to dry cleaning solvents; and to a method of making the same.

BACKGROUND OF THE INVENTION

Waterproof, moisture-vapor permeable materials have been developed which find use in garments and tents which do not leak when contacted or flexed and which are permeable to moisture such as perspiration.

U.S. Pat. No. 4,194,041 (Gore et al) incorporated by reference herein, is representative of a number of patents which describe coatings or laminates purported to provide waterproof articles which do not leak when touched and are breathable. This patent describes a layered article for use in waterproof garments or tents comprising at least two layers: an interior, continuous hydrophilic layer that readily allows water to diffuse therethrough, prevents the transport of surface active agents and contaminating substances such as those found in perspiration, and is substantially resistant to pressure induced flow of liquid water, and a hydrophobic layer that permits the transmission of water vapor and provides thermal insulating properties even when exposed to rain. The hydrophobic layer is preferably waterproof microporous tetrafluoroethylene (PTFE) or polypropylene, which permits the passage of moisture vapor through the pores thereof. The hydrophilic layer transfers moisture vapor therethrough whereupon it passes through the porous hydrophobic layer. Various means of joining the layers are suggested including the application of hydraulic pressure to force the hydrophilic polymer to penetrate into the surface void spaces of the hydrophobic layer.

U.S. Pat. No. 4,443,511 (Worden et al) incorporated by reference herein, discloses a layered article similar to that of U.S. Pat. No. 4,194,041, but formed of a breathable polytetrafluoroethylene first layer mechanically stretched at least about 5% beyond its yield point having a surface layer of elastomeric hydrophilic material having a surface in interlocking relationship with the inner face of the first layer. The interlocking relationship is said to be brought about by flowing the hydrophilic elastomeric material into the layer of hydrophobic material and then solidifying the hydrophilic material.

U.S. Patent No. 4,613,544 (Burleigh) (assigned to the assignee of the present case) incorporated by reference herein, discloses a waterproof, moisture-vapor permeable unitary sheet material which comprises a microporous polymeric matrix having pores comprising continuous passages extending through its thickness and opening into the opposite surfaces thereof, the passages being sufficiently filled with moisture-vapor permeable water-impermeable, hydrophilic material to prevent the passage of water and other liquids through the unitary sheet material while readily permitting moisture vapor transmission therethrough rendering the sheet material breathable.

A number of hydrophilic materials are susceptible to degradation. A particularly harmful type of degradation is autoxidative degradation. In addition to transition group metals, this degradation is catalyzed by chloride ion. Hindered phenolic antioxidants prevent the degradation of such materials. Thus, in order to protect such materials from salts contained in perspiration, etc., such antioxidants have been physically blended into the hydrophilic materials. Antioxidants compatible with the hydrophilic material have solubility characteristics which render them soluble in organic solvents. Consequently, these antioxidants can be extracted by contact with dry cleaning solvents over time. After removal of the antioxidant the breathable membranes experience increased susceptibility to degradation from salts contained in perspiration, etc. Hindered phenolic antioxidants which have been blended with hydrophilic materials in order to provide moisture-vapor permeable materials such as those available from Ciba Geigy Corporation under the trade designations Irganox 1010 and Irganox 1076 do not have reactive functionalities that would enable them to be directly reacted into the structure of a hydrophilic urethane polymer. Other antioxidants (i.e. hindered phenolic amide alcohols) exist which have been reacted into nonhydrophilic materials. Such nonhydrophilic modified polymers would not be useful in preparing waterproof breathable membranes. In addition, such antioxidants are not easy to prepare.

A need thus exists for a moisture-vapor permeable, water-impermeable hydrophilic polymer which is resistant to degradation from salts.

A need also exists for a waterproof breathable material which contains an antioxidant which does not leach out upon being subjected to dry cleaning solvents and which experiences the same good moisture vapor transmission rate as known materials.

A need also exists for a hindered phenolic antioxidant which is easy to prepare which can be reacted into the structure of a hydrophilic polymer. We have found such a polymer, such an antioxidant, and such a material.

SUMMARY OF THE INVENTION

The present invention provides a novel moisture-vapor permeable, water-impermeable, hydrophilic urethane polymer having a hindered phenolic antioxidant reacted into its structure. The novel polymer which can be included in a number of materials is extremely resistant to degradation from salts, etc. since the antioxidant is not leached out upon contact with dry cleaning solvents. Moreover, surprisingly, the effect of the antioxidant is not diminished by its reaction into the polymer structure.

A class of hindered phenolic antioxidants which can be reacted into the polymer structure are also novel. The invention also provides such novel hindered phenolic antioxidants.

The invention also provides waterproof breathable membranes made of the modified hydrophilic polymer.

The invention also provides various articles which include such modified polymers.

The invention provides a novel moisture-vapor permeable, water-impermeable, hydrophilic urethane polymer having about 0.1 to about 10 weight percent of a hindered phenolic antioxidant reacted into its structure.

Hindered phenolic antioxidants of the invention comprise compounds of the general formula $CR[(CH_2)_x\text{—}OH]_{3-y}[(CH_2)_q\text{—}OP]_y$ wherein R is selected from the group consisting of —H, —CH$_3$, —C$_2$H$_5$, —(CH$_2$)$_w$OH, and —(CH$_2$)$_w$OP; q is an integer of 0 to 2; x is an integer of 0 to 2; y is an integer of 1 to 2; w is an integer of 0 to 2; and P has the general formula

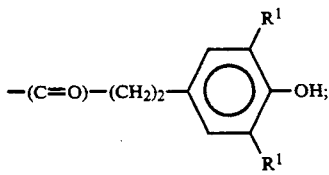

wherein R$^1$ represents a tertiary butyl group and wherein the values of x, q, and w are such that not more than one of x, q, and w can equal 0 at a time.

The invention also provides a waterproof moisture-vapor permeable material comprising: a microporous polymeric matrix having continuous pores comprising continuous passages extending therethrough opening into both surfaces thereof, and a moisture-vapor permeable, water-impermeable, hydrophilic urethane polymer having about 0.1 to about 10 weight percent of a hindered phenolic antioxidant reacted into its structure bonded to the microporous matrix.

A preferred material of the present invention provides a waterproof, moisture-vapor permeable, unitary, i.e., non-laminated and single thickness sheet material which is resistant to solvents used in the dry cleaning process that is ideally suited for use in waterproof garments, tents, and outdoor gear such as knapsacks and the like, combining exceptional durability with excellent hand or drape and a method of making the same. The sheet material comprises a microporous polymeric matrix having continuous pores comprising continuous passages extending through its thickness and opening into both surfaces thereof, the pores being sufficiently filled with a hydrophilic material comprising the above polymer having a hindered phenolic antioxidant reacted into its structure to prevent the passage of water through the unitary sheet material.

The invention also provides a method of making the unitary sheet material which method comprises the steps of (a) providing a microporous polymeric matrix having pores extending through its thickness;

(b) selecting a hydrophilic material precursor thereof which when converted to a hydrophilic material is a moisture-vapor permeable, water-impermeable hydrophilic urethane polymer having about 0.1 to about 10 weight percent of a hindered phenolic antioxidant reacted into its backbone;

(c) preparing a liquid composition comprising the hydrophilic material precursor for flowing into the pores of the matrix wherein the hydrophilic material precursor is formed by adding a hindered phenolic antioxidant having at least one functional group capable of reacting with a hydroxyl group or an isocyanate group to reactants capable of reacting in order to form a polyurethane in order to form the hydrophilic material precursor;

(d) if needed, rendering the polymeric surface of the matrix wettable to the liquid composition;

(e) causing the liquid composition to flow into the pores of the matrix; and (f) causing the hydrophilic material precursor to convert to solid hydrophilic material within the pores to sufficiently fill the pores to prevent the passage of water through the unitary sheet material.

DETAILED DESCRIPTION OF THE INVENTION

The preferred solvent resistant material of the present invention which contains the polymer of the invention is a unitary sheet material presenting a continuous non-porous surface on each surface thereof which prevents water and other liquid penetration therethrough, in very thin thickness, e.g., 5 to 250 μm, even when the liquid is propelled thereagainst with great force, as in a rainstorm. The sheet material, while waterproof, is also very moisture-vapor permeable, being capable of constructions which allow moisture-vapor from perspiration to evaporate therethrough at a rate sufficient to maintain the skin of one wearing a garment containing the sheet material in a reasonably dry state with normal use, without, however, becoming contaminated with perspiration impurities which could otherwise cause eventual leakage through the sheet.

The solvent resistant, waterproof, moisture-vapor permeable, unitary sheet material of this invention prevents the passage of water and other liquids therethrough while permitting the passage of moisture vapor therethrough. While the unitary sheet material can be tailored for varying rates of moisture-vapor permeability therethrough without disturbing the water-proofness thereof, a moisture vapor transmission rate (MVTR) of at least about 1000 g/m$^2$ per 24 hours is preferred. The MVTR can be increased to about 2000 g/m$^2$ or higher without significantly weakening the sheet material.

The term "waterproof" is used herein to describe materials which are capable of preventing the passage therethrough of liquid water by capillary action and under varying natural atmospheric conditions including pressure driven flow as may be encountered in a rainstorm. "Moisture vapor permeable" is used herein to describe materials which readily permit the passage of water vapor therethrough but which do not allow the passage of liquid water therethrough. The term "hydrophilic" is used herein to describe materials, usually polymers, which are capable of absorbing water exposed thereto in significant quantity, typically more than about 10% by volume.

The term "antioxidant containing polymer" is used herein to describe the moisture-vapor permeable, water-impermeable, hydrophilic urethane polymer of the invention having a hindered phenolic antioxidant reacted into its structure.

The "hydrophilic material" referred to herein comprises the antioxidant containing polymer. The term also includes any additional components which are added to improve the properties of the hydrophilic material but which are not actually reacted into the structure of the antioxidant containing polymer. The hydrophilic material can be bonded to the microporous matrix by a number of methods such as by curing a hydrophilic material precursor in the pores of the microporous matrix in order to form a unitary sheet material or curing a hydrophilic material precursor on a surface of the microporous matrix.

The term "hydrophilic material precursor" is used herein to describe the composition from which the hydrophilic material is formed. The composition includes those components which are capable of reacting in order to form the antioxidant containing polymer plus other optional components which are added to improve the properties of the resultant hydrophilic material but which are not actually reacted into the structure of the antioxidant containing polymer.

The term "hindered phenolic antioxidant" as used herein refers to a compound having at least one phenolic substituent, in which the two positions ortho to the phenolic hydroxyl group are substituted with a tertiary alkyl group. The para position is preferably substituted with an alkyl group containing at least one, preferably at least two, hydrogens at the alpha positions to the para group.

The terms "solvent resistant" and "dry cleaning solvent resistant" as used herein refers to materials which are resistant to degradation by dry cleaning solvents known in the art such as percloroethylene (PERC), stoddard solvents, petroleum solvents, and fluorocarbon solvents.

The solvent resistant, waterproof, unitary sheet material of the invention comprises a microporous matrix having continuous pores extending through its thickness which are filled with a moisture-vapor permeable, water-impermeable, hydrophilic material wherein the hydrophilic material comprises a urethane polymer having a hindered phenolic antioxidant reacted into its structure.

Microporous Matrix

The microporous matrix can be any material having continuous micropores through its thickness which can be filled with a liquid composition comprising the hydrophilic material precursor. While it is preferred that the entire area of a sheet material be microporous, sheets having solid, non-porous areas and microporous areas may be employed for particular applications. The pore size of the microporous matrix should be small to obtain uniform and adequate filling of the pores thought for the most part to occur by capillary action. The average size of the pores of the matrix is such that they are typically indistinguishable under magnification (e.g., 100X) of a conventional optical microscope but usually readily visible under magnification (e.g., 1000X) of an electron microscope. The pore size of a matrix will be much smaller than the matrix thickness. Preferably, the average pore size is less than about 10% of the thickness of the matrix. The average pore size for a matrix having a thickness of about 10 to 50 µm will therefore typically be on the order of 1 to 5 µm, or less. By contrast, the average pore size or opening of a woven fabric is about the same magnitude as its thickness. A matrix which has a pore size which is too large can be readily identified as it will permit the passage of water therethrough as hydrophilic material solidified therewithin will not sufficiently close the pores against the passage of liquid therethrough. Useful microporous matrices have a void volume of about 10% to 85% or higher, preferably of at least 25%, and more preferably from about 50%–85%.

The microporous polymeric matrix can be prepared by any known method of any polymeric material which is substantially impenetrable by water, i.e., absorbing no more than 5% by weight water under normal atmospheric conditions, and capable of forming such an article. Useful polymers for forming the microporous polymeric matrix include polyolefins such as polyethylene and polypropylene, polyethylenepolypropylene copolymers, polyethylene terephthalate, polycaprolactam, polyvinylidene fluoride, polybutylene terephthalate, polyester copolymer, and polytetrafluoroethylene. Any of these materials can be formed into a useful polymeric matrix by processes already known in the art. Polyolefins such as polyethylene are particularly preferred as they are tough, have excellent hand or drape and are easily wet by hydrophilic material precursors useful in the practice of this invention.

The polymeric materials used to form the microporous matrices may, of course, include various other additive ingredients to impart specific properties to the product or as a process aid. For example, the polymeric material may include ultraviolet light stabilizers, bacteriostats, insect repellants, anti-static agents, coloring dyes, plasticizers, and the like. The polymeric materials may also include residues left from processing; however, these are usually in such small amounts they do not significantly adversely effect the final product.

Methods of preparing microporous matrices which are useful in the present invention are disclosed in U.S. Pat. No. 3,953,566 which discloses a process for making microporous sheets exclusively of polytetrafluoroethylene (PTFE) and Shipman U.S. Pat. No. 4,539,256, assigned to the assignee of the present application, which discloses the preparation of microporous sheet materials from other thermoplastic polymers, both of which are incorporated herein by reference.

The polymeric materials for the microporous matrices are preferably hydrophobic, but may also be hydrophilic, and they are useful so long as an infiltrate comprising the hydrophilic material precursor is capable of filling the pores and, when solidified, prevents the passage of water therethrough while allowing moisture vapor passage therethrough.

The selection of the polymer used to form the microporous matrix will depend upon the desired utility of the waterproof sheet material of the invention. For example, if the waterproof sheet material is to be used in the manufacture of waterproof clothing, flexibility and drape are desirable characteristics. Microporous polyethylene microporous matrices are therefore preferred for such use.

Hydrophilic Materials

The hydrophilic material comprising the antioxidant containing polymer is a polymeric substance which is typically void free but may contain closed cells. This material, which is resistant to dry cleaning solvents, does not allow the passage of gases or liquids through open channels or pores in the microporous matrix but does transfer substantial amounts of water therethrough by absorbing water on one side of the sheet material, where the moisture vapor concentration is high, and evaporating it on the opposite side where the moisture vapor concentration is low. Water is not transferred by capillary action or by wicking.

The hydrophilic material precursor must have an initial state which is liquid and which wets the matrix polymer surface in order for it to flow or be imbibed into the microporous media and it must be capable of being converted from the liquid state to a solid liquid-impermeable, water vapor permeable transport material which sticks to the passage walls of the pores of the matrix. Preferably, the hydrophilic material precursor can be infiltrated into the pores of the microporous media either as a neat fluid or in solvent and cured in situ to form the hydrophilic material. The hydrophilic material precursor may have a molten state which permits infiltration, and a solid or semi-solid state when cooled. Solvent solutions of hydrophilic material precursor may also be infiltrated and the solvent evaporated. Combinations of these techniques may also be used, e.g., infiltration of a solvent solution of hydrophilic material precursor and curing before or after solvent removal, e.g., by cross-linking. When solvents are used, care should be taken in the solvent selection to avoid adversely altering the microporous matrix. The same care should be taken when using other processing conditions such as heat.

The hydrophilic material will swell or expand in volume to a certain degree in the presence of water. The volume increase should not be so great as to distort the waterproof sheet material to an extent that would cause buckling or curling when the sheet material is attached to adjacent layers in a garment or other end product formation. It is preferred that the swellability (increase in volume), be less than 100% based on the original volume. Typically, the swellability is on the order of 35-75%.

There are several different methods by which the hydrophilic material comprising the antioxidant containing polymer and the waterproof moisture-vapor permeable material containing the hydrophilic material can be prepared.

Preparation of Sheet Material

As indicated previously, the waterproof, moisture-vapor permeable material can comprise a laminate or, preferably, a unitary sheet material.

The general method of making the solvent resistant, waterproof, moisture-vapor permeable, unitary sheet material comprises the steps of providing a microporous polymeric matrix having continuous pores extending through its thickness, selecting a hydrophilic material precursor which when converted to hydrophilic material, is a moisture-vapor permeable, liquid water-impermeable, and dry cleaning solvent resistant urethane polymer having about 0.1 to about 10 weight percent of a hindered phenolic antioxidant reacted into its backbone, preparing a liquid composition comprising the hydrophilic material precursor by adding a hindered phenolic antioxidant having at least one functional group capable of reacting with a hydroxyl group or an isocyanate group with reactants capable of reacting in order to form a polyurethane, wherein the liquid composition comprising the hydrophilic material precursor wets the matrix polymer or, alternatively, rendering the polymeric surface of the matrix wettable to the liquid composition, causing the liquid composition to flow into the pores of the matrix, and causing the hydrophilic material precursor to convert to solid hydrophilic material within the pores thereby sufficiently filling the pore passage to close the pores against the passage of liquid water through the unitary sheet material.

The presently preferred method of filling the micropores involves infiltrating a precursor of the hydrophilic material which wets the matrix polymer surface into the pores and in situ curing, e.g., polymerizing, the hydrophilic material precursor to produce the hydrophilic material.

The unitary sheet material of the present invention can be conveniently prepared by applying to the surface of the microporous matrix a liquid, curable composition comprising the hydrophilic material precursor. Such compositions may be conveniently applied to the matrix by rotogravure coating devices, padding operations, dipping techniques, spraying, or other conventional coating techniques. Depending upon the microporous matrix, it may easily imbibe the coating composition or it may require preparation prior to coating. Viscosity adjustment of the coating composition may be needed in some cases to obtain good penetration by capillary action into the pores. In some cases it may be necessary to treat the surface of the microporous matrix to make it more receptive to imbibing the coating composition. For example, a microporous polytetrafluoroethylene matrix may be pre-wet with tetrahydrofuran to make it more receptive to solvent solutions which do not readily wet its surface.

The conditions under which the hydrophilic material precursor is solidified into the hydrophilic material will depend upon the particular type of liquid composition comprising the hydrophilic material precursor. Curable compositions which contain a solvent will require solvent removal which may be accomplished with the aid of moderate heating. Hydrophilic materials, which are formed from curable hydrophilic material precursors are cured under appropriate curing conditions, depending upon the particular hydrophilic material precursor. Curable hydrophilic material precursors are cured according to the requisite curing conditions, usually requiring heat or light.

The resultant waterproof, moisture-vapor permeable dry cleaning solvent resistant material of the invention is useful for making any of a variety of products. Examples of such products include garments such as rain coats, skiing apparel, snowmobile suits, snowsuits, gloves, shoes, garments to be worn in areas where chemical spills may be encountered, clean room garments, and the like. The material of the invention may also be utilized in medical applications as a wound dressing. The material may also be used to make tents and other types of camping equipment.

For such uses, the material is typically cut to form pieces which are sewn to form a garment, preferably taking care to prevent leakage at the seams by conventional techniques. Wound dressings are typically sterilized prior to use according to conventional techniques and may include other modifications such as absorbent pads and medicaments.

Although less desirable, it is foreseen that the hydrophilic material precursor could alternatively be coated onto a surface of a microporous polymeric matrix in order to form a laminate (i.e., layered article) rather than a unitary sheet material. A method of forming a laminated article is disclosed in U.S. Pat. 4,194,041 (Gore et al.), incorporated by reference herein. However, a laminate prepared according to the present invention, although being dry cleaning solvent resistant, would still have the deficiencies inherent to a laminate, e.g., an exposed, weak hydrophilic layer subject to abrasion and separation and an exposed porous hydrophobic surface that is subject to contamination. The laminate could likewise be used in making a garment, etc., as listed above.

As indicated previously, there are several different methods by which the hydrophilic material comprising the antioxidant containing polymer and a sheet material containing the hydrophilic material can be prepared.

METHOD I

Method I, which is the preferred method of preparing the hydrophilic material comprising the antioxidant containing polymer, involves the reaction of a hydrophilic material precursor comprising: a high molecular weight polyol composition comprising polyethylene oxide, a polyisocyanate, and a hindered phenolic antioxidant capable of being reacted into a polymer structure. Useful polyisocyanates according to Method I have an average NCO functionality of at least about 2.0. Preferred polyisocyanates have an average NCO functionality of about 2.3 to 3.5, most preferably about 3. Examples of useful polyisocyanates include but are not limited to the following: Desmodur N biuret derivative of hexamethylene diisocyanate (HDI); Desmodur N3300 isocyanurate derivative of hexamethylene diisocyanate; Mondur CB which is the reaction product of 1 mole of trimethylolpropane and three moles of tolylene diisocyanate (TDI); Mondur MRS which is a polyisocyanate formed by the reaction of formaldehyde with aniline with subsequent formation of the isocyanate; and Desmodur Z biuret derivative of isophorone diisocyanate (IPDI); all available under the above trade designations from Mobay Chemical Corporation.

The term "high molecular weight polyol composition comprising polyethylene oxide" refers to a polyol composition having a polyethylene oxide content of about 20 to 100 percent by weight based upon the weight of the composition. Useful polyols typically have at least two hydroxyl groups, preferably greater than two if crosslinking is desired. The polyol composition can comprise polyols selected from the group consisting of homopolymer polyols containing polyethylene oxide, polyol copolymers containing polyethylene oxide, polyols containing no polyethylene oxide, and mixtures thereof, as long as the total polyethylene oxide content of the composition falls within the range of about 20 to 100 percent based upon the weight of the composition. Useful polymers and copolymers possess average molecular weights above about 200, preferably above about 300, more preferably about 500 to 4000, and most preferably about 1000 to 2000. The polyols should have a primary or secondary aliphatic hydroxy functionality of at least two, preferably on the terminal portions of the polyol.

An example of a useful high molecular weight polyol composition comprising polyethylene oxide is a polyol copolymer comprising polyethylene oxide and a compatible material such as polypropylene oxide and the like. Other examples of useful high molecular weight polyol compositions comprising polyethylene oxide include but are not limited to the following: Carbowax TM 1000, a 1000 molecular weight polyethylene oxide diol available from Union Carbide; Carbowax TM 600, a 600 molecular weight polyethylene oxide diol available from Union Carbide; and Pluronic TM 10R5, a polypropylene oxide/polyethylene oxide ABA block copolymer available from BASF Corporation, having an average molecular weight of 1950 and an average OH equivalent weight of 975. The "A" block of Pluronic TM 10R5 copolymer comprises polypropylene oxide, the "B" block comprises polyethylene oxide. The weight ratio of polypropylene oxide to polyethylene oxide in the copolymer is 1:1. The Pluronic TM 10R5 copolymer which possesses terminal hydroxyl groups is capable of reacting with isocyanates in order to form high molecular weight polymers. Pluronic TM L35 polypropylene oxide/polyethylene oxide ABA block copolymer, available from BASF, is another useful high molecular weight polyol. The "A" block comprises polyethylene oxide and the "B" block comprises polypropylene oxide. The molecular weight and weight ratio of polyethylene oxide to polypropylene oxide is the same as for the Pluronic TM 10R5 copolymer. The major difference between the Pluronic TM L35 and Pluronic TM 10R5 copolymers is that the Pluronic TM L35 copolymer possesses primary alcohol functionality whereas the Pluronic TM 10R5 copolymer possesses secondary alcohol functionality. Under similar conditions primary alcohols react more quickly with isocyanates than secondary alcohols. Another useful high molecular weight polyol composition comprising polyethylene oxide is TMP 920, a polyethylene oxide based molecule having a nucleus of trimethylolpropane (TMP) which is available from BASF Corporation. TMP 920 has a molecular weight of 1058; 920 of its molecular weight being attributable to polyethylene oxide. TMP 920 is a triol and thus can be reacted with a difunctional isocyanate in order to form a crosslinked polymer.

The antioxidant containing polymer of the invention has about 0.1 to about 10 weight percent of a hindered phenolic antioxidant reacted into its structure, preferably about 0.1 to about 2 weight percent, most preferably about 0.1 to about 1 weight percent, based upon the weight of the polymer. Useful hindered phenolic antioxidants are those which possess at least one reactive functional group, preferably at least two, wherein each reactive functional group is capable of reacting with either an isocyanate or a hydroxy functional group present on one of other reactants used in forming the antioxidant containing polymer (i.e. polyols, isocyanates). Thus, the reactive functional group should be capable of reacting with at least one type of functional group selected from the group consisting of hydroxyl groups and isocyanate groups. The reactive functional group may be capable of reacting with both types of functional groups.

Although it is preferred that the hindered phenolic antioxidant have at least two functional groups in order to react the hindered phenolic antioxidant into the polymer structure, a hindered phenolic antioxidant having one reactive functional group is also useful, especially when a crosslinked polymer system is being formed.

Although the preferred reactive functional group present on the hindered phenolic antioxidant is an aliphatic hydroxyl functionality that is either primary or secondary, it is foreseen that there are a number of other reactive functional groups that the hindered phenolic antioxidant could possess which would enable the hindered phenolic antioxidant to be reacted into the polymer structure. Examples of such reactive functional groups include, but are not limited to, those selected from the group consisting of: isocyanate groups, amine groups, carboxylic acid groups, oxirane groups, thiol groups, and mixtures thereof, in addition to hydroxyl groups. Hindered phenolic antioxidants having one or more hydroxyl functional groups are preferred due to their ease of preparation and subsequent handling.

The hydroxyl functionality on the phenolic portion of the hindered phenolic antioxidant is not considered to be reactive in terms of reacting the hindered phenolic antioxidant into the polymer structure. The extreme lack of reactivity of the phenolic group in 2,6 di-t-butyl phenols is discussed in the J. Am. Chem. Soc. 1945, 67, 303-307. On the other hand, the phenolic portion of the hindered phenolic antioxidant is reactive in the sense that it is responsible for the stabilization of the polymer.

Examples of hindered phenolic antioxidants which can be reacted into the polymer structure include but are not limited to hindered phenolic alcohols having at least one, preferably at least two hydroxyl groups, wherein each hydroxyl group is capable of reacting with an isocyanate or hydroxyl group present on one of the other reactants.

Examples of hindered phenolic alcohols which are useful in the polymer of the invention include but are not limited to those selected from the group consisting of hindered phenolic antioxidants of the general formula (I)

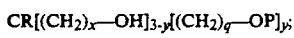

wherein R is selected from the group consisting of —H, —CH$_3$, —C$_2$H$_5$, —(CH$_2$)$_w$OH, and —(CH$_2$)$_w$OP; q is an integer of 0 to 2; x is an integer of 0 to 2; y is an integer of to 2; w is an integer of 0 to 2; and P has the general formula

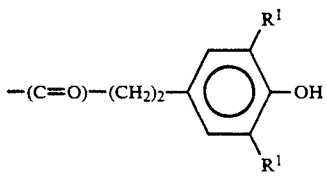

wherein R$^1$ represents a tertiary butyl group and wherein the values of x, q, and w are such that not more than one of x, q, or w can equal 0 at a time; and hindered phenolic antioxidants of the general formula

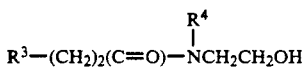      II wherein R$^3$ has the formula

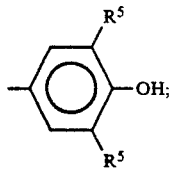

R$^5$ represents a tertiary butyl group; and R$^4$ is selected from the group consisting of —H and —CH$_2$CH$_2$OH.

Preferred hindered phenolic alcohols of the general formula (I) are those wherein R is —(CH$_2$)$_w$OH; q is 1; x is 1; y is 1-2; and w is 2 since these antioxidants do not lower the degree of cross-linking of the antioxidant containing polymer prepared therefrom. When R$^4$ comprises an alkyl group, preferably R$^4$ comprises a C$_{1-5}$ alkyl group, most preferably a C$_{1-2}$ alkyl group.

The hindered phenolic alcohols (I) of the invention which are useful in the polymer of the invention can be prepared by a number of different methods. One method involves the acid catalyzed transesterification of a multifunctional antioxidant of the general formula (III)

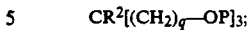

wherein R$^2$ is selected from the group consisting of —H, —CH$_3$, —CH$_2$CH$_3$, and —(CH$_2$)$_w$OP; and P, q, and w are as defined above, with a polyol of the general formula (IV)

wherein R$^6$ is selected from the group consisting of —H, —CH$_3$, —C$_2$H$_5$, and —(CH$_2$)$_w$OH, and wherein x and w are as defined above.

Antioxidants of the general formula (III) are commercially available. An example of such an antioxidant is Irganox 1010, a pentaerythritol ester of 3,5-di-t-butyl-4-hydroxydihydrocinnamic acid, available from Ciba Geigy Corporation. Useful polyols of the general formula (III) include but are not limited to pentaerythritol, trimethyolpropane, and glycerol.

Hindered phenolic alcohols of the formula (I) can also be prepared by the acid catalyzed esterification of the above polyol (IV) with acid derivative (v). Acid derivative (V) has the following general formula:

      V wherein P is as defined above.

The hindered phenolic alcohol (II) can be prepared by first converting acid derivative (V) to its acid chloride. This can be done by treating acid derivative (V) with thionyl chloride, phosphorous pentachloride or phosgene. The intermediate thus formed is then added to an amine alcohol in the presence of a tertiary amine base in order to yield the hindered phenolic alcohol (II). The use of an amine such as diethanolamine yields an amide diol while the use of an amine such as ethanolamine yields an amide monool.

As indicated above, numerous polyisocyanates, high molecular weight polyol compositions comprising polyethylene oxide, and hindered phenolic antioxidants can be used in preparing the antioxidant containing polymer of the invention. Each particular reactant has its advantages as well as its disadvantages. For example, the HDI based polyisocyanates provide antioxidant containing polymer having superior physical as well as water vapor transmission properties although they are not as cost effective as some other materials. The Pluronic TM high molecular weight polyols are easy to handle due to their liquid nature but provide somewhat less desirable antioxidant containing polymers due to their polypropylene content which does not contribute to the ability to transmit water vapor. Carbowax TM 1000 high molecular weight polyol is advantageous in that antioxidant containing polymers having high polyethylene oxide content can be prepared therefrom, which polymers possess high MVTR values in addition to superior strength, however, it has a high melting point of about 40° C. Both Carbowax TM 600 and TMP 920 high molecular weight polyols have the advantages of being liquids, but provide antioxidant containing polymers having lower MVTR values.

The coating solution components used in forming the hydrophilic material precursor according to Method I can be combined in a number of different manners. Typically, two separate component streams are brought together and mixed in a static mixer just prior to coating. The first stream typically comprises about 5 to 60 weight percent polyisocyanate, about 10 to 70 weight percent high molecular weight polyol composition comprising polyethylene oxide, about 0.5 to 10 weight percent hindered phenolic antioxidant capable of being reacted into the polymer, and about 25 to 75 solvent based upon the weight of the components comprising the first stream. Preferred solvents include those solvents or mixtures of solvents having solubility parameters above about 8.5 and boiling points below about 150° C. Solvents having hydroxylic or amine functionality are not preferred. Preferred solvents include but are not limited to the organic solvents selected from the group consisting of methyl ethyl ketone (MEK), acetone, butyl acetate, ethyl acetate, methyl isobutyl ketone, tetrahydrofuran (THF), toluene, xylene, and mixtures thereof. Most preferred solvents are selected from the group consisting of butyl acetate, MEK, xylene, and mixtures thereof. The second stream typically comprises about 5 percent to about 10 percent of a catalyst in a suitable solvent, such as those described above, based upon the weight of the second stream. The mixture which is obtained by combining the two streams is typically about 40 to 60, preferably about 40 to 50, percent solids by weight. The resultant mixture is typically pumped through a coating bar onto a gravure cylinder which is the device that actually meters the coating solution onto the porous membrane. During these combining and coating stages, the extent of reaction should be minimized in order to avoid the inhibition of membrane penetration as well as clotting of the coater head.

According to a preferred method, static mixing of the components occurs in a chamber from which the mixture is fed into a flow bar which feeds a gravure cylinder/nip arrangement. This arrangement meters a controlled amount of unreacted hydrophilic material precursor onto the porous matrix. Typically about 0.5 percent dibutyl tin dilaurate is used as the catalyst based upon the total weight of the components. The oven temperature is typically set at about 120° C. over an average residence time of 3-4 minutes; higher temperature are typically avoided in order to avoid melting of the porous matrix material such as a porous polyethylene matrix.

Examples of useful catalysts include dibutyltin dilaurate, bis(lauryldibutyltin) oxide, dibutyltin diacetate, dibutyltin dimercaptide, dibutyltin dithioglycolate, dimethyltin dilaurate, dimethyltin dimaleate, dimethyltin dimercaptide, dimethyltin dithioglycolate, dioctyltin dilaurate, dioctyltin dimercaptide, dioctyltin dithioglycolate, stannous octoate, stannous stearate, bismuth neodecanoate, and phenylmercuric propionate. Other metal compounds that can be used to catalyze the reaction include lead octoate, mercury stearates, mercuric acetate, lead, mercury, and bismuth. Tin compounds are preferred as they are less toxic. Dibutyltin dilaurate is particularly preferred as it is less subject to oxidation.

In general, according to the methods of the invention including Method I and the following Method II, about a 10 percent excess equivalent of isocyanate functionality to hydroxyl functionality in the high molecular weight polyol is used (NCO/OH=1.1) since evaporation of the solvent can cause water to form on the coated membrane. Water can react with an isocyanate group to form a urea bond instead of the urethane bond which is formed by the reaction of an alcohol with an isocyanate.

The coating solution comprising the hydrophilic material precursor prepared according to Method I, Method II, or an alternate method, may include various additive ingredients which do not affect the water vapor transmissive properties of the hydrophilic material prepared therefrom or its ability to prevent passage of liquid water. Examples of additive materials include bacteriostats, insect repellants, antistatic agents, and the like.

METHOD II

Method II is a second method of preparing the hydrophilic material comprising the antioxidant containing polymer and is also referred to as the "prepolymer method". According to Method II, part of the reaction is carried out prior to the coating of the microporous polymeric matrix. The method calls for first preparing a prepolymer by reacting one equivalent of a high molecular weight polyol composition comprising polyethylene oxide with two equivalents of a diisocyanate so that the general reaction is:

OCN—X—NCO + HO—Y—OH + OCN—X—NCO ⟶

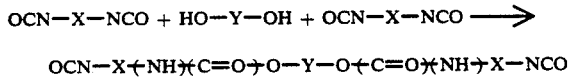

Examples of useful high molecular weight polyols comprising polyethylene oxide include but are not limited to those listed under Method I. Examples of useful diisocyanates include but are not limited to those selected from the group consisting of tolylene diisocyanate (TDI), including 2,4-tolylene diisocyanate and 2,6-tolylene diisocyanate; isophorone diisocyanate, hexamethylene diisocyanate (HDI); diphenlymethane diisocyanate (MDI); 1,4-xylene diisocyanate; 1,3-xylene diisocyanate; 1,4-cyclohexane diisocyanate; 1,5-diisocyanato napththalene; 1,4 diisocyanato benzene; methylene-bis-(4-cyclohexyl isocyanate) (H$_{12}$MDI); available from Mobay Chemical Corporation, and the like.

At elevated temperatures the prepolymer preparation can occur rapidly without the use of a catalyst. At lower temperatures a catalyst is preferably used, such as those set forth in Method I. In general, the prepolymer preparation can be accomplished by heating the reactants at about 70° C. to 250° C., preferably about 120° C. to 125° C. until the reaction is substantially completed. If a secondary polyol is reacted with a secondary diisocyanate or a hindered aromatic diisocyanate, longer reaction times may be required. There is a tendency for the reaction to be quite random, resulting in the formation of oligomers as well as yielding unreacted diisocyanate. This tendency can be overcome by reacting the high molecular weight polyol with a large excess of the diisocyanate and by distilling off the remainder or else by using a diisocyanate which has two different isocyanate moieties such that one reacts much faster than the other. The first option tends to be more expensive since it involves an additional step.

The prepolymer method, in which the formation of the prepolymer is an extra step, may be justified for a number of reasons. First, if a linear antioxidant containing polymer is desired, as opposed to the crosslinked antioxidant containing polymer which is prepared according to Method I, it is preferred that a prepolymer first be formed which is subsequently reacted with a chain extender, such as a short chain diol, along with a suitable hindered phenolic antioxidant, such as those set forth in Method I, in order to form the antioxidant containing polymer.

Compatibility is another consideration in deciding whether to use the prepolymer method. In many cases a particular polyol is not compatible with a particular diisocyanate. This problem can often be overcome by forming a prepolymer from the two reactants. Also, certain polyols and diisocyanates are not soluble in the organic solvent from which it is desired that they need to be coated. This problem can often be overcome by reacting the polyol and diisocyanate in order to form a prepolymer having a solubility which renders it soluble in the desired solvent. The prepolymer can then be reacted with a chain extender along with the hindered phenolic antioxidant in order to form an antioxidant containing polymer.

Melting point is another consideration in determining whether to use the prepolymer method. For example, Carbowax TM 1000 polyol is a low melting waxy solid. The use of such a polyol can cause difficulties since there is a tendency for it to crystallize out during the coating process. Reacting the Carbowax TM 1000 polyol with a diisocyanate such as HDI will result in the formation of a prepolymer having a depressed melting point in addition to slowing the rate of crystallization.

Examples of useful short chain diols which can be used as chain extenders include but are not limited to those selected from the group consisting of: butane diol, diethylene glycol, trimethylolpropane (when crosslinking is desired), triethanolamine, n-alkyldiethanolamine, and mixtures thereof. Water can be used as a chain extender, but it is not preferred. In addition to the smaller diols larger polyols may be used as chain extenders. Examples of such larger polyols include Pluracol TM PEP 450 and 550, both available from BASF, having OH equivalent weights of 100 and 125, respectively. Plutocol TM PEP 450 and 550 are polypropylene glycols having OH functionalities of four and are the reaction products of pentaerythritol and polypropylene oxide. Other polyols which can be used as chain extenders include the high molecular weight polyols described in Method I.

After the formation of the prepolymer, according to Method II, the remaining components can be combined and coated in a manner similar to that disclosed in Method I.

The particular method selected (i.e., Method I, Method II, or an alternate method) depends upon a number of factors including whether it is desired that the final antioxidant containing polymer which can comprise the reaction product of a variety of isocyanates or isocyanate derivatives, polyols, and hindered phenolic antioxidants, be a linear or crosslinked urethane polymer. According to Method I, a crosslinked polymer is typically formed. According to Method II, a linear or crosslinked polymer can be formed. However, it is more difficult to prepare a crosslinked polymer according to Method II than it is to prepare a crosslinked polymer according to Method I. A hydrophilic material precursor which upon cure results in a crosslinked polymer system is preferred since it is easier to prepare and coat. A linear polymer system is desirable when a hydrophilic material having thermoplastic qualities is desired. Other methods may be utilized other than Methods I and II, including methods which have similarities both to Method I and Method II.

The moisture vapor transmission rate of the antioxidant containing polymers of the invention may be controlled by varying the proportion of polyethylene oxide contained therein. The polyethylene oxide moiety forms a separate phase within the antioxidant containing polymer through which the moisture vapor transmission rate will vary in proportion to the polyethylene oxide content although not necessarily in a linear manner. The polyethylene oxide content is preferably greater than 10% by weight in the urethane polymer to obtain preferred moisture vapor transmission rates of at least 1000 g/m$^2$ per 24 hours, most preferably about 30 to 80 percent by weight in order to obtain a moisture vapor transmission rate of at least about 2000 g/m$^2$ per 24 hours.

The moisture vapor transmission characteristics of the waterproof moisture-vapor permeable material of the invention, including the layered article and the unitary sheet material, are governed by the thickness of the material and the composition of the hydrophilic material. Generally, the moisture vapor transmission rate varies inversely with the thickness of the material, i.e., with thicker waterproof materials having lower moisture vapor transmission rates. Preferred unitary sheet materials according to the invention have a thickness on the order of 5 to 250 micrometers, most preferably 5 to 150 micrometers.

A vapor pressure differential between opposite sides of the waterproof, moisture-vapor permeable material promotes moisture vapor transmission through the material. Thus, when the material of the invention is used in a rain garment, the wearer is maintained in a dry condition under exterior wet or rainy conditions because of the difference in water vapor pressure with temperature between the exterior of the garment and its interior, i.e., the area near the body. The surface insulative value of the material of the invention in the garment creates a temperature difference between the inside of the garment and the outside to provide the vapor pressure differential which promotes moisture vapor transmission from the wearer to the outside of the garment and keeps the wearer dry. If the wearer generates more moisture than can be transmitted through, e.g., by exercise, it may be desirable to include a layer of water sorbent material on the interior of the garment, next to the wearer. Suitable sorbent materials include webs of polymeric fibers. Such webs may also provide additional insulation for warmth. A preferred insulating material which can be used to form a layered construction with the waterproof moisture-vapor permeable material of the invention is sold under the trademark "Thinsulate" by the Minnesota Mining and Manufacturing Company.

Exterior Layer

It is preferred to employ the waterproof moisture-vapor permeable material of the present invention such as the unitary sheet material or layered article as the inside layer of a garment with a preferably stronger exterior layer. It is undesirable for the exterior layer to become wet. Therefore, the exterior layer is preferably a breathable fabric which is treated to be water-repellent. Fabrics for use as the exterior layer include tightly woven fabrics of fine hydrophobic fibers including polyolefin fibers such as polyethylene and polypropylene, nylon, blends of such fibers with natural fibers such as cotton and other fibers, any of which may be treated with water repellants. Preferred fabrics for the exterior of a layered construction include nylon cloths such as nylon tricot and cloth available under the trademarks "Taslin" or "Ripstop", cotton/polyester blends and the like. Suitable water repellent materials for treatment of the exterior fabric are commercially available, for example, under the trademarks "Scotchgard" or "Zepel".

An adhesive can be used to laminate the waterproof moisture vapor permeable material such as the unitary sheet material or layered article of the invention to a fabric. The preferred adhesive is a polyether aliphatic urethane. A useful adhesive can be made by preparing a prepolymer of polytetramethylene oxide glycol (PTMO) and $H_{12}MDI$ and chain extending the prepolymer into a urethane diol using diethylene glycol (DEG). A crosslinker such as a difunctional isocyanate can be added. The adhesive should have a high enough viscosity at 65 percent solids in order to form a discrete dot and yet a low enough viscosity at 100 percent solids to penetrate fiber bundles that have been treated with durable water repellant finishes (DWR).

Abbreviations

Pluronic ™ 10R5 w an ABA block copolymer of polyoxypropylene (A) and polyoxyethylene (B) at an equal weight ratio, available from BASF Corporation.

Desmodur N=Biuret derivative of hexamethylene diisocyanate, available from Mobay Chemical Corporation.

Desmodur W=methylene-bis-(4-cyclohexyl isocyanate), available from Mobay Chemical Corporation.

Desmodur N-75=a 75% solution of Desmodur N in xylene/butyl acetate, available from Mobay Chemical Corporation.

T-12=dibutyltin dilaurate, available from M&T Chemicals Incorporated.

EXAMPLES

The invention is illustrated by the following Examples, wherein all units including parts and percentages in the Examples and the rest of the Specification are by weight unless otherwise stated.

EXAMPLE 1

Preparation of Antioxidant Polyol

Into a 3-liter flask were charged 500 g of Irganox 1010 antioxidant, 59.0 g of pentaerythritol, and 10.68 g of p-toluenesulfonic acid. The flask contents were heated for 16 hours at 100° C. After 16 hours had elapsed, the mixture was cooled to about 100° C. and 500 g of toluene were added. The flask contents were cooled to 20° C. and 22.0 g of sodium carbonate was added by slurrying it in toluene. The mixture was stirred for about 1 hour to neutralize the residual p-toluenesulfonic acid. After the hold period, the reaction was filtered to remove the sodium carbonate and the salts. The solution was vacuum stripped to remove the toluene following which 500 g of MEK was added to dissolve the product oil.

EXAMPLE 2

Preparation of Antioxidant Amide Diol

A solution containing 13.9 g of 3-(3,5-di-tert-butyl-4-hydroxyphenyl)propionic acid in 15 ml of thionyl chloride was heated to reflux until the gas evolution ceased. The excess thionyl chloride was removed by distillation. The residue was taken up in 50 ml of tetrahydrofuran and added to a solution containing 10.5 g of diethanolamine and 6.0 g of diisopropylethylamine in 100 ml of tetrahydrofuran. The addition was carried out over 30 minutes. The mixture was stirred at room temperature for 1.5 hours following which 100 ml of water was added. The organic layer was separated from the aqueous phase and to it was added 50 ml of ethyl acetate. It was washed with 100 ml of water, dried over sodium sulfate and the solvent removed to yield 21.5 g of crude amide diol. The crude amide diol was purified by column chromatography over silica eluted with methlyene chloride:ethyl acetate to give 13.0 g of pure 3,5-di-tert-butyl-4-hydroxy-N,N-bis (2-hydroxyethyl)benzenepropanamide.

EXAMPLE 3

Preparation of Antioxidant Amide Monool

The procedure of Example 2 was followed except for the substitution of a similar molar quantity of ethanolamine for diethanolamine. Instead of column chromatography, the crude amide monool was recrystallized from a 1:1 mixture of hexane and ethyl acetate. The crystals of the amide monool were collected by filtration and dried.

EXAMPLE 4

Membrane Preparation and Evaluation

The following coating and laminating experiment was performed on a 41 cm pilot coater. A double unwind system was used in which the top unwind was a silicone release paper liner and the bottom unwind was a porous polyethylene membrane. The tensions of the two unwinds were matched so that there was no folding of the porous polyethylene membrane. The coating was delivered to the porous polyethylene membrane by a two part system. The first part contained 950 g of Pluronic ™ 10R5 copolymer, 210 g of Desmodur N, 950 g of MEK, and 24 g of antioxidant polyol prepared according to Example 1 (50% in MEK). The second part contained the catalyst, T-12, dibutyltin dilaurate (5% in MEK). The flowrates of the two streams were controlled by two gear pumps (first pump 1,162 cc/rev, catalyst pump 0,292 cc/rev). The volumetric rates were adjusted such that the final % solids of the mixed reactants were 46% by weight. This was achieved by adjusting the pumps to equal RPMs and bringing the catalyst level to approximately 2% by weight of the total solids.

The two streams of reactants were combined in a static mixer and then directed into a slot bar from where the reactants were pumped onto a trihelical gravure cylinder having 15.7 lines/cm, a volume factor of 51 microns, and an internal tooth angle 135°. The reactants saturated the porous polyethylene membrane and the web was cured in three ovens at 65° C., 115° C., and 115° C. The coating speed was 3.65 m/min with a four minute residence time. The weight of the membrane was 4.5 g/m$^2$ and the final membrane weight was 21 g/m$^2$.

Preparation of a Laminate—A laminate was prepared by bonding the coated membrane of Example 4 to a nylon fabric by means of an adhesive. The adhesive was prepared in the following manner. An isocyanate prepolymer was prepared by reacting one mole of polytetramethylene oxide glycol (molecular weight 1000) with 2 moles of Desmodur W, methylene-bis-(4-cyclohexyl isocyante) at 125° C. for two hours. A urethane polyol was prepared by reacting one NCO equivalent of the isocyanate prepolymer with 1.85 equivalents of diethylene glycol (DEG) at 125° C. for two hours. For handling purposes the isocyanate prepolymer was diluted to 75 percent solids (by weight) in MEK. The urethane diol was diluted to 60 percent solids (by weight) in MEK. Desmodur N-75 crosslinker was used. The adhesive components were used in the following amounts.

| Material | Weight g. | Equivalents |
|---|---|---|
| Urethane diol (60% solids) | 2000 | 1.21 |
| Isocyanate Prepolymer (75% solids) | 900 | 0.89 |
| Desmodur N-75 Crosslinker | 100 | 0.39 |

The resultant adhesive had a Brookfield viscosity of 6000 cps at 65 percent solids.

The coated material was wound onto a core and as such was ready for the lamination step. The coated material was unwound onto the same coater head. The coated material was then printed with the urethane adhesive. A pyramid roll, 60% land area and a dot pattern of 97 dots/cm$^2$, was wiped with a flexible steel blade and the adhesive was transferred onto the coated membrane in a discontinuous pattern. The dot printed membrane was dried in the oven at 65° C. and then laminated in a 93° C. nip to a pure finish nylon supplex type fabric 85 g/m$^2$. The laminate was then rolled up onto cores and cured at 65° C. for 16 hours.

Salt Challenge Test

Since chloride ion is a ubiquitous body chemical, testing for the autoxidative degradation of the hydrophilic polyurethane catalyzed by chloride ion is quite important. The test procedure used to determine the presence of an adequate amount of antioxidant in the membrane was to swab an "X" pattern of 5% NaCl, dissolved in 20% ethanol/water, on the membrane layer of the laminate and heat the laminate at 115° C. for 15 minutes. Depolymerization could be readily observed by simply washing the laminate in water. Subsequent drying revealed white spots where depolymerization had occurred. The white spots indicated the presence of the original porous polyethylene membrane from which the urethane polymer had been removed.

A set of panels were prepared from the above laminate as well as a similar laminate prepared using Irganox 1010 antioxidant in place of the antioxidant polyol of Example 1. The two sets of panels were subjected to a series of 1, 3 and 5 dry cleanings in perchloroethylene. Both sets of panels were swabbed on the membrane side with the above mentioned saline solution and tested in the above manner. The material containing the antioxidant polyol showed no apparent change. The material containing the Irganox 1010 antioxidant showed complete depolymerization in all three cases (1x, 3x, and 5x). This indicated that the antioxidant had been removed during dry cleaning rendering the urethane polymer unstable.

EXAMPLE 5

Membrane Preparation and Evaluation

A porous polyethylene membrane having a thickness of 18 microns and a weight of 42 g/m$^2$ was stretched onto an aluminum pan using clips. Four coating solutions (Samples 5A-5D) were prepared from the following: 32.6 g Pluronic TM 10R5 copolymer (50% in MEK); 7 g Desmodur N (50% in MEK); 0.06 g dibutyl-tin dilaurate; and the following amounts of polyol antioxidant prepared according to Example 1 with a concentration by weight of 5% in MEK.

| Sample | Weight of 5% Polyol Antioxidant |
|---|---|
| 5A | 0.4 g |
| 5B | 1.2 g |
| 5C | 2.4 g |
| 5D | 4.0 g |

The coating solution was poured onto the porous polyethylene membrane and swabbed in a brushing motion until full penetration was achieved and a thin film of the coating solution was left on the membrane. The coated membrane was then placed in a vented oven at 120° C. where it was allowed to cure for 10 minutes. Afterwards, the coated membrane showed an average coating weight of 230 g/m$^2$.

Control Example 6

Four coated membrane (Samples 6A-6D) were prepared according to the procedure of Example 5 except for the substitution of the following amounts of Irganox 1076 antioxidant (5% by weight in MEK) for the polyol antioxidant.

| Sample | Weight of 5% Irganox 1076 |
|---|---|
| 6A | 0.4 g |
| 6B | 1.2 g |
| 6C | 2.4 g |
| 6D | 4.0 g |

Control Example 7

Two coated membrane (Samples 7A-7B) were prepared according to the procedure of Example 5 except for the substitution of the following amounts of Irganox 1010 antioxidant (5% in MEK) for the polyol antioxidant.

| Sample | Weight of 5% Irganox 1076 |
|---|---|
| 7A | 1.2 g |
| 7B | 2.0 g |

EXAMPLE 8

A coated membrane was prepared according to the procedure of Example 5 except for the substitution of 2.0 g of the amide monool prepared according to Example 3 at a concentration of 5% by weight in MEK for the polyol antioxidant.

Efficacy Test

A cotton swab saturated with a 10% solution of cobalt chloride dissolved in 25% aqueous isopropanol was rubbed onto several areas of coated membranes prepared according to Example 5 and Control Examples 6-7. Cobalt chloride can cause the degradation of hydrophilic polyurethane in a manner similar to sodium chloride, which is present in human perspiration. Cobalt chloride, however, was used in this example in order to facilitate the testing procedure since the use of cobalt chloride results in an increased polymeric degradation rate. Each treated membrane sample was placed into an oven set at 121° C. Each of the treated areas were periodically checked for signs of polymer decomposition by washing the spot with water. Failure was noted by the polymer dissolving, at which point the polyethylene membrane returned to its original white cast, denoting loss of urethane from that area. The times to failure for the various membranes are set forth in Table I. The antioxidant materials which were added as 5% solutions of MEK are reported in concentration units of equivalents/gram.

TABLE I

| Membrane | | Concentration of Antioxidant (eq/g × $10^{-6}$) | Seconds to Failure | Ln (sec) |
|---|---|---|---|---|
| Control Ex. 6 | 6A | 1.9 | <30 | <3.4 |
| (Irganox 1076 | 6B | 5.7 | 60 | 4.1 |
| Antioxidant) | 6C | 11.3 | 600 | 6.4 |
| | 6D | 22.6 | 3600 | 8.2 |
| Control Ex. 7 | 7A | 10.2 | 360 | 5.9 |
| (Irganox 1010 Antioxidant) | 7B | 17 | 1800 | 7.5 |
| Example 5 | 5A | 3.1 | 60 | 4.1 |
| (Antioxidant | 5B | 9.4 | 300 | 5.7 |
| polyol) | 5C | 18.9 | 1800 | 7.5 |
| | 5D | 31.6 | 10200 | 9.23 |
| Example 8 | | 15.6 | 3600 | 8.19 |

It was noted that the data presented in Table I agrees experimentally with the following formula $$\text{Ln}(T_{seconds}) = 0.25 \left( \text{Conc.} \frac{eq}{g} \times 10^{-6} \right) + 3.0.$$

This is irrespective of the nature of the antioxidant itself, demonstrating that the mobility of the antioxidant does not appear to be a factor in the efficacy of the antioxidant, i.e., reacting the antioxidant into the polymer does not affect is operation.

Effect of Antioxidant Concentration on MVTR

A series of tests were run in order to evaluate the effect of antioxidant concentration on the moisture vapor transfer rate (MVTR) of the unitary sheet materials of the invention. Four coating solutions E-H were prepared according to the procedure set forth in Example 5. The formulations were as follows:

| Sample | % Antioxidant Polyol of Ex. 1 | Pluronic 10R5 | Desmodur N | Antioxidant Polyol of Ex. 1 |
|---|---|---|---|---|
| E | 1% | 30 g | 6.9 g | 0.4 g |
| F | 3% | 30 g | 7.4 g | 1.2 g |
| G | 5% | 30 g | 7.8 g | 2.0 g |
| H | 10% | 30 g | 9.2 g | 4.3 g |

Each sample also contained 0.06 g of dibutyltin dilaurate. Coated membranes were prepared from each coating solution sample according to Example 5. Three samples of each membrane sample were separately affixed to 225 g glass jars with rubber bands. Into each jar had been placed 100 g of 40° C. water. The distance from the surface of the water to the membrane was 63 mm. The jars were weighed and then placed onto a rack so that their positions were stable and placed into an oven set at 39° C. Residence time in the oven was 13.5 hours. The jars were then reweighed and the MVTR was reported in g/m2-24 hours. MVTR was calculated according to the following formula:

$$\text{MVTR} = \frac{(\text{Weight loss g}) \times 24}{(\text{Membrane area M}^2) \times (\text{Duration hours})}$$

| Sample | % Antioxidant Polyol | MVTR g/m$^2$—24 Hours |
|---|---|---|
| E | 1% | 3640 |
| F | 3% | 3075 |
| G | 5% | 2950 |
| H | 10% | 2550 |

The above data demonstrates that good MVTR values are obtained even when as much as 10% antioxidant polyol is reacted into the hydrophilic urethane polymer backbone.

EXAMPLE 9

Preparation of Prepolymer

Into a first vessel was charged 1312 g of Carbowax TM 1000, a 1000 molecular weight polyethylene oxide diol (2.62 eq) which was melted by heating to 55° C. The melted Carbowax TM 1000 diol was poured into a second vessel, into which was subsequently charged 688 g of Desmodur W($H_{12}$MDI) (5.25 eq), following which the two components were mixed. The temperature of the mixture was 40° C. The second vessel was sealed and placed into a vented oven set at 120° C. After three hours the second vessel was removed and allowed to cool until it was just warm to the touch. At that point, 667 g of MEK were added with mixing to form a 75 percent solids solution of the prepolymer.

Control Example 10

Into a vessel were charged 30 g of the prepolymer of Example 9 which had been diluted to 50 percent solids in MEK; 1.6 g butanediol (50 percent solids in MEK); 1.6 g Irganox 1010 antioxidant (5 percent solids in MEK); and 0.06 g of dibutyltin dilaurate and subjected to the conditions of Example 5 in order to form a coated membrane.

EXAMPLE 11

Into a vessel were charged 30 g of the prepolymer of Example 9 which had been diluted to 50 percent solids in MEK; 3 g of antioxidant amide diol prepared according to Example 2; 0.9 g of butanediol, and 0.06 g of dibutyltin dilaurate and subjected to the conditions of Example 5 in order to form a coated membrane.

Viscosity Determination

Coating solution samples prepared according to Control Example 10 and Example 11 were separately poured into small aluminum pans and placed in an oven set at 121° C. for 20 minutes in order to allow them to undergo polymerization. The IR spectra were checked and each sample showed the same excess NCO peak at 2250 cm$^{-1}$. The samples were then left at ambient for two days. A portion of each polymer sample was dissolved in dimethylformamide (DMF) at a 20 weight percent concentration in order to form a solution. The viscosity of each solution was measured at room temperature on a Brookfield viscometer. Example 10=1600 cps; Example 11 =570 cps.

The data suggests that none of the materials are crosslinked, otherwise they would have gelled. Thus they are linear polymers. The thermoplastic qualities of each of these materials was assessed by sealing two pieces of each material together on an impulse bag sealer. All of the materials formed strong enough seals that when the seal was stressed the break did not occur in the seal itself but in another part of the membrane.

While this invention has been described in connection with specific embodiments, it should be understood that it is capable of further modification. The claims herein are intended to cover those variations which one skilled in the art would recognize as the chemical equivalent of what has been described here.

We claim:

1. A polymer comprising a moisture-vapor permeable, water-impermeable, hydrophilic urethane polymer having a hindered phenolic antioxidant reacted into its structure wherein said urethane polymer comprises the reaction product of a polyisocyanate having an NCO functionality of at least about 2.0 with a polyol having at least two hydroxyl groups and a polyurethane oxide content of from about 20 to about 100 percent by weight based upon the weight of the polyol, wherein said hindered phenolic antioxidant is selected from the group consisting of hindered phenolic antioxidants of the general formula $CR[(CH_2)_x-OH]_{3-y}[(CH_2)_1-OP]_y$ wherein R is selected from the group consisting of —H, —CH$_3$, —C$_2$H$_5$, —(CH$_2$)$_w$OH, and —(CH$_2$)$_w$OP;

q is an integer of 0 to 2;

x is an integer of 0 to 2;

y is an integer of 1 to 2;

w is an integer of 0 to 2; and

P has the general formula

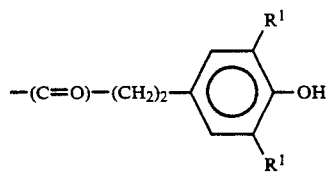

wherein R$^1$ represents a tertiary butyl group and wherein the values of x, q, and w are such that not more than one of x, q, and w can equal 0 at a time; and hindered phenolic antioxidants of the general formula

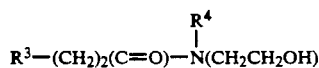

wherein R$^3$ has the formula

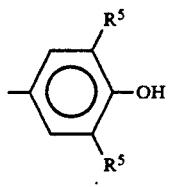

wherein

R$^5$ is a tertiary butyl group; and

R$^4$ is selected from the group consisting of —H, an alkyl group, and —CH$_2$OH; and wherein the hydrophilic urethane polymer comprises the reaction product of:
(a) about 0.1 to about 10 weight percent of the hindered phenolic antioxidant;
(b) about 5 to about 60 weight percent of a polyisocyanate; and
(c) about 10 to about 70 weight percent of a polyol composition having an average molecular weight of about 500 to about 4000 comprising about 20 to 100 weight percent polyethylene oxide based upon the weight of the polyol composition.

2. The polymer of claim 1 wherein said hydrophilic urethane polymer has reacted into its structure about 0.1 to about 2 weight percent of a hindered phenolic antioxidant.

3. The polymer of claim 1 wherein said hydrophilic urethane polymer has reacted into its structure about 0.1 to about 1 weight percent of a hindered phenolic antioxidant.

4. The polymer of claim 1 wherein the hindered phenolic antioxidant has the general formula $CR[(CH_2)_x-OH]_{3-y}[(CH_2)_q-OP]_y$; and wherein R is —(CH$_2$)$_w$OH;

q is an integer of 1;

x is an integer of 1;

y is an integer of 1–2; and w is an integer of 2; and

P is as defined in claim 1.

5. The polymer of claim 1 wherein the hydrophilic urethane polymer comprises the reaction product of:
(a) about 0.1 to about 2 weight percent of the hindered phenolic antioxidant;
(b) about 20 to about 40 weight percent of the polyisocyanate; and
(c) about 30 to about 70 weight percent of the high molecular weight polyol composition comprising about 20 to 100 weight percent polyethylene oxide based upon the weight of the high molecular weight polyol composition.

6. The polymer of claim 4 wherein the hydrophilic urethane polymer comprises the reaction product of:
(a) about 0.1 to about 2 weight percent of the hindered phenolic antioxidant;
(b) about 20 to about 40 weight percent of the polyisocyanate; and
(c) about 30 to about 70 weight percent of polyol composition comprising about 20 to 100 weight percent polyethylene oxide based upon the weight of the polyol composition.

* * * * *

UNITED STATES PATENT AND TRADEMARK OFFICE
CERTIFICATE OF CORRECTION

PATENT NO. : 5,326,847
DATED : July 5, 1994
INVENTOR(S) : Malcolm B. Burleigh et al.

It is certified that error appears in the above-indentified patent and that said Letters Patent is hereby corrected as shown below:

Col. 11, line 27, "y is an integer of to 2;" should read --y is an integer of 1 to 2;--.

Col. 15, line 40, "Plutocol™" should read --Plurocol™--.

Col. 17, line 24, "10R5 w" should read --10R5 =--.

Col. 18, line 43, "1,162" should read --1.162--.

Col. 18, line 44, "0,292" should read --0.292--.

Col. 21, line 37, "affect is" should read --affect its--.

Col. 23, line 30, "$CR[(CH_2)_x\text{-}OH]_{3\text{-}y}[(CH_2)_1\text{-}OP]_y$" should read --$CR[(CH_2)_x\text{-}OH]_{3\text{-}y}[(CH_2)_q\text{-}OP]_y$--

Signed and Sealed this

Thirteenth Day of August, 1996

Attest:

BRUCE LEHMAN

*Attesting Officer*     *Commissioner of Patents and Trademarks*